US011834146B2

United States Patent
Bardet et al.

(10) Patent No.: US 11,834,146 B2
(45) Date of Patent: Dec. 5, 2023

(54) INSULATION BLANKET WITH COLLECTION PLATE CONNECTED TO A THROUGH-ORIFICE FOR DISCHARGING WATER

(71) Applicant: Airbus Operations (S.A.S.), Toulouse (FR)

(72) Inventors: Aurélien Bardet, Toulouse (FR); Jérome Terrier, Toulouse (FR); Matthieu Escude, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 71 days.

(21) Appl. No.: 17/385,025

(22) Filed: Jul. 26, 2021

(65) Prior Publication Data
US 2022/0033050 A1 Feb. 3, 2022

(30) Foreign Application Priority Data
Jul. 31, 2020 (FR) ...................................... 2008148

(51) Int. Cl.
*B64C 1/06* (2006.01)
*B64C 1/40* (2006.01)
(52) U.S. Cl.
CPC ................. *B64C 1/067* (2013.01); *B64C 1/40* (2013.01)
(58) Field of Classification Search
CPC ................................... B64C 1/067; B64C 1/40
See application file for complete search history.

(56) References Cited

U.S. PATENT DOCUMENTS

| 10,814,954 | B2 * | 10/2020 | Zaman | ...................... B64C 1/40 |
| 2010/0044512 | A1 * | 2/2010 | Paul | ......................... B64C 1/067 |
| | | | | 244/129.1 |
| 2013/0009010 | A1 | 1/2013 | Auriac et al. | |
| 2018/0162511 | A1 * | 6/2018 | Larson | .................... B64C 1/067 |
| 2018/0201357 | A1 * | 7/2018 | Borumand | .............. B64C 1/403 |
| 2019/0106191 | A1 * | 4/2019 | Hitchcock | ............... B64C 1/067 |

FOREIGN PATENT DOCUMENTS

| DE | 10 2010 006564 | 8/2011 |
| EP | 3 476 713 A1 | 5/2019 |
| FR | 2 977 568 A1 | 1/2013 |

OTHER PUBLICATIONS

French Search Report for Application No. 2008148 dated Apr. 7, 2021.

\* cited by examiner

*Primary Examiner* — Brady W Frazier
*Assistant Examiner* — Shanna Danielle Glover
(74) *Attorney, Agent, or Firm* — KDW Firm PLLC

(57) ABSTRACT

A simple and lightweight system for discharging water that can flow out through an orifice in an insulation blanket lining the walls of a fuselage of a transport vehicle such as an aircraft. The blanket has an impermeable collection plate having at least partially the shape of a channel, container or the like for collecting and discharging condensation water under the effect of gravity through an orifice.

14 Claims, 4 Drawing Sheets

INSULATION BLANKET WITH COLLECTION PLATE CONNECTED TO A THROUGH-ORIFICE FOR DISCHARGING WATER

CROSS-REFERENCE TO RELATED APPLICATION

This application claims priority to French patent application number 20 08148 filed on Jul. 31, 2020, the entire disclosure of which is incorporated by reference herein.

TECHNICAL FIELD

The disclosure herein relates to the leaktightness of acoustic and/or thermal insulation blankets provided in the cabins of transport vehicles, in particular aircraft cabins. It relates more particularly to a system for discharging water, in particular condensation water liable to pass through these blankets, and to the vehicles provided with such systems.

BACKGROUND

In an aircraft, the inner faces of the lateral walls of the fuselage are generally covered with acoustic and/or thermal insulation blankets. The blankets are then also themselves lined with finishing panels that can be seen from the cabin. The blankets make it possible in particular to protect the passengers from the cold and from the noise coming from the engines. Installed between the insulation blankets and the finishing panels are numerous systems, such as electrical wiring, hydraulic ducts, air conditioning pipework, various items of equipment, etc. However, these systems are retained by support elements mounted on the fuselage, requiring orifices to be made in the blanket to allow these elements to pass through it. The cabin of a commercial aircraft is relatively humid, the passengers contributing to this by their breathing. In flight, the low temperatures of the outside air cool the structure of the aircraft and the water present in the air of the cabin condenses on the cold walls of the fuselage. The orifices made in the blankets can impair the leaktightness thereof, since they form a possible passage for the condensation water.

French patent FR2977568 shows a system for draining condensation water from an aircraft, comprising drainage pipes which extend on the outside of the blanket over its inner face as far as the floor, at which the water passes through the blanket with the aid of a specific pass-through device. The overall system thus forms a complex assembly.

SUMMARY

An object of the disclosure herein is to present an alternative which makes it possible to simplify the discharging system as a whole.

To that end, the disclosure herein relates to a blanket for a cabin of a transport vehicle comprising a fuselage, the insulation blanket having two faces, a face known as the outer face that is intended to be affixed along the fuselage and an opposite face known as the inner face, the blanket having at least one through-orifice through which condensation water is able to flow out, wherein the blanket has an impermeable collection plate having at least partially the shape of a channel, container or the like for collecting and discharging condensation water under the effect of gravity through an orifice.

The disclosure herein provides at least one of the following optional features, taken individually or in combination.

The collection plate comprises a central wall in the shape of a channel with curved/bent lateral edges for guiding and discharging the condensation water through the orifice.

The plate forms a container in combination with the blanket, the container having an orifice for discharging condensation water.

The orifice through which condensation water flows out constitutes the orifice for discharging it.

The orifice for discharging condensation water is separate from the orifice through which it flows out and is located in line with the latter.

The collection plate passes through the orifice.

The collection plate is fastened to the blanket at least partially in a removable manner.

The disclosure herein also relates to an aircraft comprising a cabin which has a fuselage provided with an insulation blanket having one or more of the features presented above, and at least one through-orifice through which an element for supporting equipment is inserted, wherein the contour of the projection of the collection plate onto a horizontal plane surrounds that of the projection of the support element onto this same horizontal plane.

The disclosure herein provides at least one of the following optional features, taken individually or in combination.

When viewed from above, the edges of the collection plate protrude beyond the edges of the support element in a direction perpendicular to the blanket and in a direction parallel thereto.

The collection plate comprises an opening, at least partially passing through it, for receiving the support element.

BRIEF DESCRIPTION OF THE DRAWINGS

Other objects, features and advantages will become apparent from the following description of the disclosure herein, which description is given solely by way of non-limiting example, with reference to the accompanying drawings in which.

DETAILED DESCRIPTION

The disclosure herein applies to any cabin, enclosure or the like of a transport vehicle provided with at least one insulation blanket on one of its walls, referred to generically as a fuselage in the following text, having at least one orifice for the passage of various systems and requiring the integration of a system 1 for discharging water (shown in FIGS.

Figure 1:
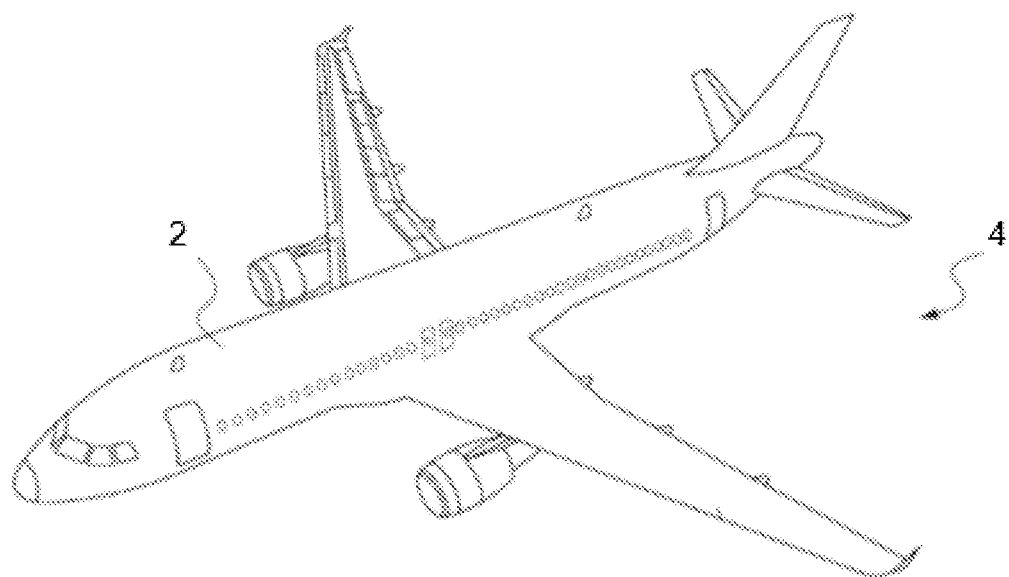
FIG. 1 is a perspective view of an example of an aircraft able to be provided with a discharging system according to the disclosure herein.

2 through 6) and more particularly condensation water which can flow out through this orifice into the cabin. The following description considers the example of the passenger cabin 2 of a commercial transport aircraft 4 shown in FIG. 1.

Figure 2:
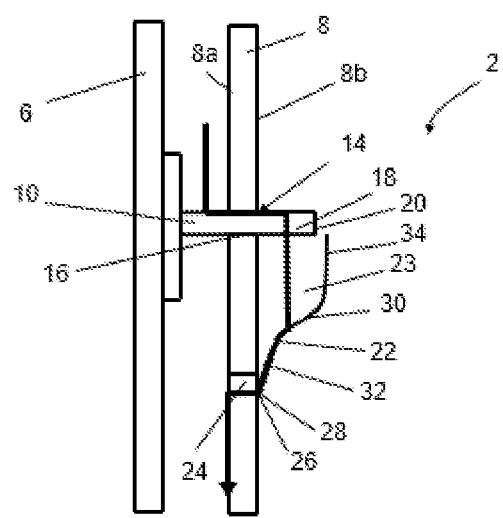
FIG. 2 is a simplified schematic view in lateral section of an embodiment of the discharging system, which is shown installed on a blanket affixed to an aircraft fuselage.

FIG. 2 shows in section a portion of an aircraft fuselage 6 covered with an acoustic and/or thermal insulation blanket 8. In FIGS. 2 to 6, the blanket is depicted at a distance from the fuselage to facilitate the depiction of the discharging system, but in reality the blanket is affixed to the surface of the fuselage. In the following description, the inner faces of the designated systems are those which face the inside of the cabin 2 and the outer faces are those on the opposite side which face the outside of the cabin. The blanket 8 has an outer face 8a facing the fuselage 6 and an opposite inner face 8b directed towards the cabin 2. The terms above, below, or any related vocabulary are defined with respect to the vertical. Anything designated as being above is located vertically higher in references to constituent parts of the assembly described, knowing that the aircraft in question is considered to be on the ground on a horizontal plane perpendicular to a vertical direction.

As is indicated above but not shown, numerous items of equipment, cables, ducts and systems of any type may be provided between the blanket 8 and a finishing panel, which is not shown. These items of equipment are retained by mounting support elements 10 fastened to the fuselage 6. To do this, the support element 10 must pass through the blanket. Zones 14, referred to as reserve zones, are provided on the blanket, and through-orifices 16 for the passage of the support elements 10 are formed in these zones. The mounting support element 10 illustrated in FIGS. 2 and 3 has a connecting bar 18 intended to pass through the orifice 16. When the support element 10 is installed so as to pass through the blanket, itself affixed to the fuselage 6, the end 20 of the connecting bar 18 projects from the blanket towards the inside of the cabin and can therefore be seen from the inside of the cabin without the finishing panel.

The discharging system 1 according to the disclosure herein comprises an impermeable collection plate 22 fastened to the blanket directly or indirectly and more precisely here, in the example described, to one of the faces 8a or 8b of the blanket or to both. As a result, in the remainder of the description, the plate will be understood as forming part of the blanket. In the embodiment illustrated in FIGS. 2 and 3, the plate 22 is fastened to the inner face 8b and is connected to a second orifice 24 below the first orifice 16. The collection plate 22 at least partially forms, with the blanket 8, a container 23 (vessel, reservoir or the like), this container being provided with the second orifice 24, allowing the water coming from the first orifice 16 to be collected and discharged under the effect of gravity through the second orifice 24.

Figure 3:
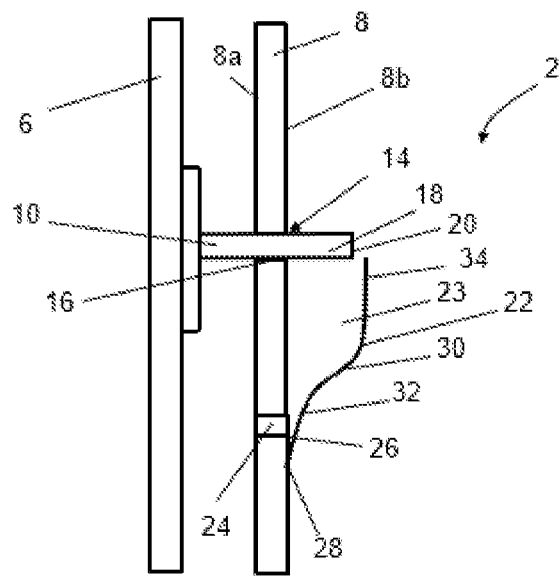
FIG. 3 is a sectional view identical to that of FIG. 2, in which the collection plate of the discharging system is disposed differently.

The walls of the container make it possible to form a barrier to the passage of water into the cabin, to retain it in the container, and to guide it to be discharged under the effect of gravity. The walls of the container therefore have a larger span than that of the support element 10 in order to be able to catch and receive the condensation water which flows out therefrom: more precisely, the contour of the projection of the collection plate 22 onto a horizontal plane surrounds that of the projection of the support element 10 onto one and the same horizontal plane. As shown in FIGS. 2 and 3, when viewed from above, the edges of the collection plate 22 protrude beyond the edges of the support element 10 in a direction perpendicular to the blanket and in a direction parallel thereto. In this way, if a droplet reaches a transverse or longitudinal limit of the end of the element 10 by falling under the effect of gravity, the plate 22 located beyond this limit retains the droplet in order to guide it towards the orifice 24. Viewed from above, the element 10 is surrounded by the collection plate 22.

Each first through-orifice 16 or only some of them, depending on requirements, are equipped with such a discharging system 1. The plate 22 and the second orifice 24 have a shape and are positioned so as to collect the water that has passed through the first orifice 16 in order to guide it towards the second orifice 24 passing through the blanket in order to return it to the outer face 8a of the blanket that faces the fuselage 6. The path followed by the water is indicated by an arrow in FIG. 2.

According to one possible embodiment, the second through-orifice 24 is positioned in line with the first orifice 16, below the latter, horizontally as close as possible to the first orifice. However, the second orifice 24 might not be in line with the first orifice 16 if the collection plate has a shape allowing the condensation water to be caught and directed towards the orifice 24. The plate 22 has any type of shape that makes it possible to catch a water droplet falling under the effect of gravity from the end of the support element, as from the connecting bar 18 in the example depicted in the figures. The plate 22 has a double curvature, allowing it to form a container with the face 8b of the blanket. In the embodiment illustrated in FIG. 2, the lowest point 26 of the collection plate directly matches the lowest point 28 of the second orifice 24. Part of the edge of the collection plate 22 follows the edge of the second orifice 24 so that there is no through-passage at the second orifice 24 between the outer face 8a and the outside of the container. According to another possible embodiment such as the one illustrated in FIG. 3, the lowest point 28 of the second orifice is located above the lowest point 26 of the collection plate: water can then stagnate in the bottom of the container, the main thing being that it does not enter the cabin. According to one embodiment, the distance between the two points 26 and 28 is small enough for the stagnant water to evaporate rapidly.

In the embodiment shown in FIGS. 2 and 3, the plate 22 has the shape of a funnel section. It may for example comprise a part 30 which is flared upwardly to receive the water and, below the part 30, a part 32 with a steeper slope to guide the water towards the second orifice. The lower edge of the plate is affixed to the blanket and fastened thereto by any type of known means, for example by heat-bonding. The lower part 32 at least partially forms a hollow receptacle with the blanket, making it possible to prevent water from spilling out into the cabin by flowing out beyond the edges of the plate 22. The collection plate 22 may have an upper end part 34, the surface of which is at least partially cylindrical with an axis parallel to the face 8b of the insulation blanket.

According to one embodiment of the disclosure herein, the plate 22 may have for example with the insulation blanket the shape of a half-basin, meaning that it assumes a broad, shallow and very flared shape.

Figure 4:
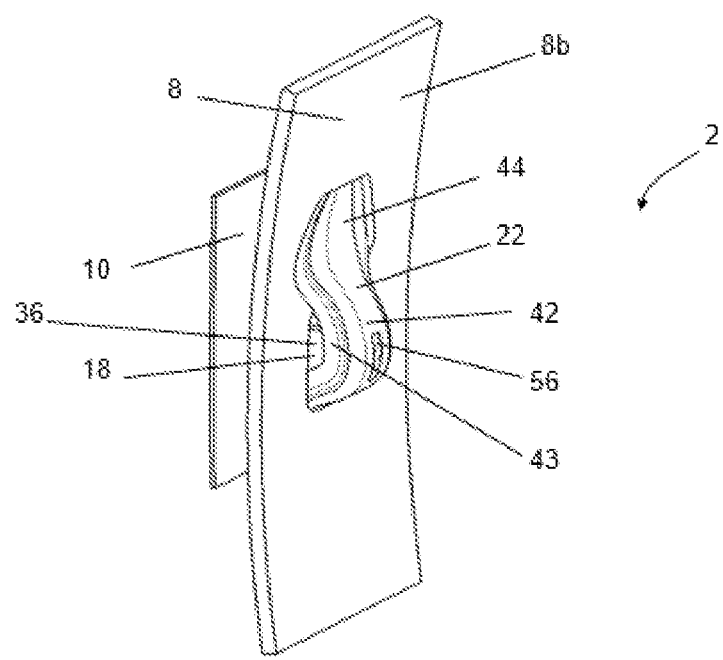
FIG. 4 is a simplified perspective view of a second embodiment of the discharging system, which is shown installed on a blanket.
Figure 5:
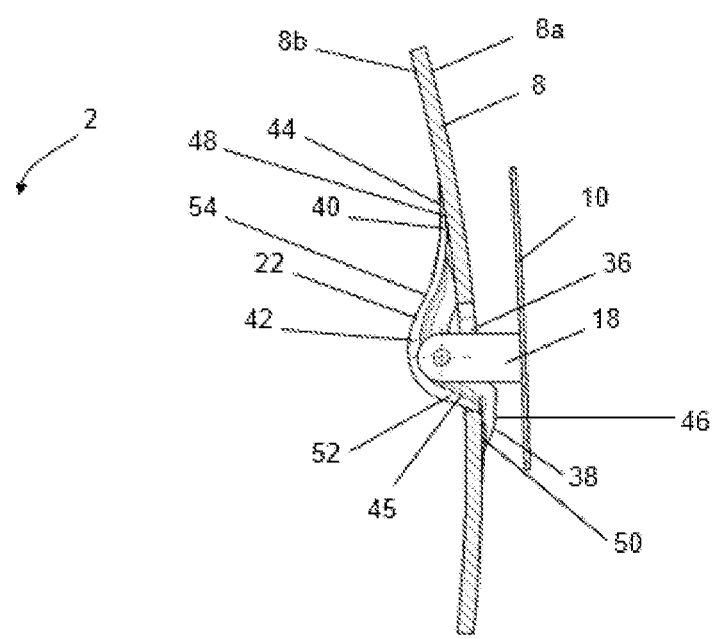
FIG. 5 is a side view in section of the discharging system shown in FIG. 4.
Figure 6:
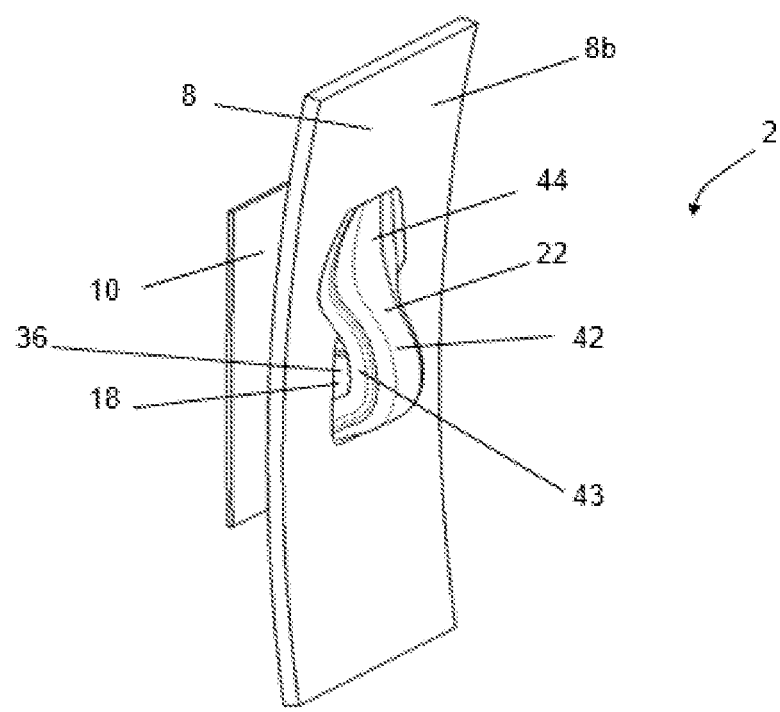
FIG. 6 is a simplified perspective view of a third embodiment, which is identical to that of FIG. 4 except that the collection plate does not comprise a through-opening for the passage of a support element.

FIGS. 4 to 6 show another embodiment of the discharging system 1, the differently shaped collection plate 22 of which passes through the blanket to guide the condensation water to the outer face 8a of the blanket. In this other embodiment, the second orifice 24 corresponds to the first orifice 16: the first orifice 16 and the second orifice form only a single orifice 36, which passes through the blanket 8. The collection plate 22 has the shape of a channel passing through the blanket 8 through the orifice 36. Because it passes through the orifice 36, one of the ends 38 in the vertical direction of the collection plate 22 is fastened to the face 8a of the blanket, the other end 40, situated vertically opposite, of the plate 22 being fastened at a higher level to the face 8b of the blanket.

The collection plate 22 has an approximate overall omega shape in section in a side view as shown in FIG. 5. The plate 22 has a curved central wall 42 with curved or bent lateral edges 43, 45 forming a channel, at each end of which there are two respective walls 44, 46 forming a base, referred to as feet 44, 46. Each foot 44, 46 has at least one planar surface 48, 50, respectively, for making contact with the blanket: the surfaces 48, 50 are not in one and the same plane, one 50 of the planar surfaces 48, 50 of the feet as seen previously being held against the inner face 8a of the blanket and the other 48 being held against the face 8b. In the embodiment depicted, the surface 48 of the foot 44 has a widened portion to provide a larger surface of attachment to the blanket. The same can be the case for the foot 46. The curvature of the central wall 42 may have any shape that allows it to go around any support element 10 able to be installed in the corresponding orifice 36. The wall 42 surrounds the support element 10 on the outside so as to form a barrier to the passage of water into the cabin, to retain it in the wall 42 forming a channel, and to guide it to the outer face 8a of the blanket in order to discharge it under the effect of gravity. In the embodiment depicted, the wall 42 comprises two faces 52, 54 which meet at a point where the tangent is approximately (knowing that the fuselage has a slight curvature that follows the blanket) parallel to the planar surfaces 48, 50 of the feet 44, 46. The face 52 of the wall 42 passing through the blanket has a steeper slope than the other face 54. The lateral edges 43, 45 of the wall 42 are bent/curved such that the water does not escape via the sides. In the embodiment illustrated, the section of the wall 42 has the overall shape of a U. The curved lateral faces do not have to be parallel as in the case of a U: they have a shape that makes it possible to prevent water from flowing out via the sides of the wall 42. The edges 43, 45 channel the water inside the wall 42 in order to guide it to the outer face 8a. Just as for the container in the preceding embodiment, the wall 42 has a larger span than that of the support element 10 in order to be able to catch and receive the condensation water which flows out therefrom: more precisely, the contour of the projection of the collection plate 22 onto a horizontal plane surrounds that of the projection of the support element 10 onto one and the same horizontal plane. The curved edges of the plate 22 should lie beyond the edges of the support element so as to catch any droplet flowing out from the support element. The plate 22 forms a conduit, a gutter surrounding that part of the support element that projects in the direction of the cabin from the blanket, to catch any water droplet flowing out from the support element. It is not necessary for the plate 22 to have a shape with a curved edge above the support element, since the water droplets flow out downwards. In the embodiment, this is the case in order to ensure continuity of shape and to avoid any disruption in shape, thus improving the ease of use. When viewed from above, the edges of the collection plate 22 protrude beyond the edges of the support element in a direction perpendicular to the blanket and in a horizontal direction parallel thereto. The plate 22 provides a surface surrounding all the faces of the support element from which a water droplet is liable to flow out. The water droplet thus falls into that part of the plate that forms a channel and is channelled by the plate so as to flow out towards the desired zone, specifically the other, outer face 8a of the blanket.

In the embodiment illustrated in FIG. 4, an opening 56 is provided in the collection plate 22, through which the support element 10 can be inserted. The support element 10 bears against the plate 22. The support element 10 can pass through the plate 22 to allow the operator easier access to the support element 10, which then protrudes outwardly beyond the collection plate 22 in the direction of the cabin 2. An operator can thus directly access the support element 10 to fasten the equipment. According to another embodiment, illustrated in FIG. 6, the plate 22 does not have holes. It may also have partial holes, specifically holes that do not open into the cabin: in the latter case, the collection plate forms a continuous closed surface on the side of the cabin. In the same way, a through-opening could be provided in the embodiment illustrated in FIGS. 2 and 3.

The fastening of the plate 22 at its upper end, specifically at the level of the foot 44, may be removable to allow an operator to move the plate away from the blanket in order to access the mounting support element without damaging the plate or the blanket and to more easily fasten the equipment to the mounting support 10. In this case, a hook-and-loop type fastening may be used in order to quickly and easily attach the foot 44 of the plate 22 to the blanket and remove it therefrom. A stronger fastening can also be considered, for example by heat-bonding or adhesive bonding, specifically one that may damage the plate and/or the blanket when an attempt is made to remove the foot 44 from the blanket, in which case, the operator reaches through the sides of the plate to fasten equipment to the mounting support element. A removable or strong fastening of the two feet 44, 46 of the plate 22 to the blanket may likewise be provided.

Any other shape that allows the collection plate associated with one or more orifices passing through the blanket to catch the condensation water flowing out from the mounting support element 10 into the cabin and to guide it through the blanket towards the outer face 8a is conceivable.

Thus, it may combine the features of the first and second shapes. For example, in the first embodiment, the collection plate 22 could be removably fastened to the blanket like the first embodiment for easier access to the mounting element when the items of equipment are being fastened. The plate 22 could likewise extend and protrude vertically beyond the support element 10: an opening 56 of the same type as that in the second embodiment could then be provided in the plate 22. It may also be conceivable for the plate 22 to be extended by a duct passing through the orifice 24, like the part 42 which forms a channel in the second embodiment. In the second embodiment, provision could be made for the central wall 42, which forms a channel, to pass through the blanket through an orifice 24 separate from the orifice 16 as in the first embodiment.

The plate 22 can be made of any type of material, such as metal, plastic, etc. It must be rigid enough not to deform but be relatively thin in order to be lightweight and easy to handle. Depending on the interior lining of the blanket, it may be necessary to add a duct, pipe, drain or the like inside it to allow the water to pass through the blanket without flowing out inside it. The orifice 24, 36 has a diameter which is large enough to allow the water to flow out through it but as small as possible so as not to impair thermal and acoustic qualities of the blanket.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
    a fuselage;
    a cabin within the fuselage;
    an insulation blanket arranged around the cabin, the insulation blanket comprising:
        an outer face for affixing along the fuselage;
        an inner face, which is an opposite face from the outer face;
        at least one first through-orifice;
        at least one second through-orifice configured to discharge condensation water, under effect of gravity, from the inner face to the outer face; and
        an impermeable collection plate attached to and extending away from the inner face; and
        supporting equipment comprising a support element that is inserted through the at least one first through-orifice, wherein the support element is configured such that the condensation water flows through the support element, from the outer face to the inner face;
    wherein the collection plate has, at least partially, a shape of a channel or container for collecting and directing, under the effect of gravity, the condensation water received from the support element to the at least one second through-orifice; and
    wherein a contour of a projection of the collection plate onto a horizontal plane surrounds a contour of a projection of the support element onto a same horizontal plane.

2. The aircraft of claim 1, wherein an upper edge of the collection plate protrudes inwardly beyond the support element in a direction perpendicular to and away from the inner face of the insulation blanket.

3. The aircraft of claim 1, wherein the collection plate comprises an opening, at least partially passing through the collection plate, for receiving the support element.

4. The aircraft of claim 1, wherein the collection plate comprises a central wall in a shape of the channel, the central wall having curved or bent lateral edges for guiding and discharging the condensation water, which is received from an end of the support element that protrudes through the at least one first through-orifice, through the at least one second through-orifice, from the inner face to the outer face.

5. The aircraft of claim 1, wherein the collection plate is in a shape of the container, the container being positioned such that a lower edge of the container is at the at least one second through-orifice for discharging the condensation water from the inner face to the outer face.

6. The aircraft of claim 1, wherein:
    the at least one second through-orifice is separate from the at least one first through-orifice; and
    the at least one second through-orifice is positioned vertically beneath and in line with, in a direction of gravity, the at least one first through-orifice.

7. The aircraft of claim 1, wherein the collection plate is fastened to the inner face of the insulation blanket at least partially in a removable manner.

8. An aircraft comprising:
    a fuselage;
    a cabin within the fuselage;
    an insulation blanket arranged around the cabin, the insulation blanket comprising:
        an outer face for affixing along the fuselage;
        an inner face, which is an opposite face from the outer face;
        at least one through-orifice that has an upper portion and a lower portion, wherein the lower portion is at a lower height than the upper portion and is configured to discharge condensation water, under effect of gravity, from the inner face to the outer face; and
        an impermeable collection plate attached to and extending away from the inner face; and
        supporting equipment comprising a support element that is inserted through the upper portion of the at least one through-orifice, wherein the support element is configured such that the condensation water flows through the support element, from the outer face to the inner face;
    wherein the collection plate has, at least partially, a shape of a channel or container for collecting and directing, under the effect of gravity, the condensation water received from the support element to the lower portion of the at least one through-orifice; and
    wherein a contour of a projection of the collection plate onto a horizontal plane surrounds a contour of a projection of the support element onto a same horizontal plane.

9. The aircraft of claim 8, wherein an upper edge of the collection plate protrudes inwardly beyond the support element in a direction perpendicular to and away from the inner face of the insulation blanket.

10. The aircraft of claim 8, wherein the collection plate comprises an opening, at least partially passing through the collection plate, for receiving the support element.

11. The aircraft of claim 8, wherein the collection plate comprises a central wall in a shape of the channel, the central wall having curved or bent lateral edges for guiding and discharging the condensation water, which is received from an end of the support element that protrudes through the upper portion of the at least one through-orifice, through the lower portion of the at least one through-orifice, from the inner face to the outer face.

12. The aircraft of claim 8, wherein the collection plate is in a shape of the container, the container being positioned such that a lower edge of the container is at the lower portion of the at least one through-orifice for discharging the condensation water from the inner face to the outer face.

13. The aircraft of claim 8, wherein the collection plate passes through the lower portion of the at least one through-orifice.

14. The aircraft of claim 8, wherein the collection plate is fastened to the inner face of the insulation blanket at least partially in a removable manner.

\* \* \* \* \*